(12) United States Patent
Boncompagne et al.

(10) Patent No.: US 10,688,742 B2
(45) Date of Patent: Jun. 23, 2020

(54) OPERATION OF A TIRE VULCANIZATION SYSTEM

(71) Applicant: COMPAGNIE GENERALE DES ETABLISSEMENTS MICHELIN, Clermont-Ferrand (FR)

(72) Inventors: Thibault Boncompagne, Clermont-Ferrand (FR); Thomas Simonelli, Clermont-Ferrand (FR); Franck Guerin, Clermont-Ferrand (FR); Jean-Charles Ferrand, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 117 days.

(21) Appl. No.: 16/070,108

(22) PCT Filed: Jan. 6, 2017

(86) PCT No.: PCT/EP2017/050245
§ 371 (c)(1),
(2) Date: Jul. 13, 2018

(87) PCT Pub. No.: WO2017/121685
PCT Pub. Date: Jul. 20, 2017

(65) Prior Publication Data
US 2019/0030847 A1   Jan. 31, 2019

(30) Foreign Application Priority Data
Jan. 14, 2016   (EP) ..................... 16305028

(51) Int. Cl.
*B29D 30/06*   (2006.01)
(52) U.S. Cl.
CPC ...... *B29D 30/0662* (2013.01); *B29D 30/0654* (2013.01); *B29D 2030/0669* (2013.01); *B29D 2030/0675* (2013.01); *B29D 2030/0677* (2013.01)
(58) Field of Classification Search
CPC ............ B29D 30/0654; B29D 30/0662; B29D 2030/0667; B29D 2030/0669; B29D 2030/0675; B29D 2030/0677
See application file for complete search history.

(56) References Cited

U.S. PATENT DOCUMENTS

| | | | |
|---|---|---|---|
| 4,422,987 A | 12/1983 | Arimatsu | |
| 5,055,245 A | 10/1991 | Hisatomi et al. | |
| 5,683,643 A | 11/1997 | Laurent | |
| 6,474,968 B1 | 11/2002 | Mitamura et al. | |
| 7,435,069 B2 * | 10/2008 | Okada | B29C 35/0294 425/174.4 |
| 10,124,550 B2 * | 11/2018 | Massoptier-David | B29D 30/0662 |
| 2004/0247717 A1 | 12/2004 | Okada et al. | |

(Continued)

FOREIGN PATENT DOCUMENTS

| | | |
|---|---|---|
| EP | 0686492 A1 | 12/1995 |
| GB | 951049 | 3/1964 |

(Continued)

*Primary Examiner* — James P Mackey
(74) *Attorney, Agent, or Firm* — Venable LLP

(57) ABSTRACT

In an electric vulcanization process, open loop and closed loop control modes can be used for controlling a heater output.

13 Claims, 3 Drawing Sheets

(56) References Cited

U.S. PATENT DOCUMENTS

2011/0262572 A1  10/2011  Fricke et al.
2019/0030846 A1   1/2019  Boncompagne et al.

FOREIGN PATENT DOCUMENTS

JP   2006-26925 A    2/2006
WO  2013/164282 A1  11/2013

* cited by examiner

OPERATION OF A TIRE VULCANIZATION SYSTEM

TECHNICAL FIELD

The presently disclosed invention is generally directed to tire vulcanization. More particularly, the presently disclosed invention is directed to determination of the energy balance in a tire vulcanization system.

BACKGROUND

During vulcanization of a tire, one or more tire vulcanizing systems may be employed for use with a tire mold. A principal characteristic of certain vulcanization systems is to place a system of heating and ventilation at the heart of an electric vulcanization system and thus provide a heated medium. For example, in an electric press, after a green tire is charged in a mold, supply of a high-temperature and high-pressure heating medium (hereinafter "heating medium") into a bladder (i.e., one formed from an elastic material such as butyl rubber) causes the bladder to expand and thereby engage an inner wall surface of the tire.

Referring to FIG. 1, an exemplary tire vulcanizing system 10 of this type is shown for vulcanizing a green tire P. System 10 includes a fluid-tight enclosure 12 that receives a supply of a pressurized heating medium (e.g., nitrogen gas). The enclosure has a cavity 14 formed by a pair of plates 16, 18 connected by a bladder 20 with an operating shaft 22 effecting axial movement of at least one plate (as shown, plate 16 is axially displaceable). A heater 24 having one or more heating elements 24a heats the heating medium. It is understood that heater 24 may be selected from any amenable heating means, including but not limited to resistors, induction elements and the like. A fan 26, driven by an ensemble of a rotor 30 and a stator 31 (together forming a motor), agitates the heating medium at a high speed ω with respect to heater 24 so that heat is supplied to the heating medium at a high heat exchange ratio. Both heater 24 and fan 26 are enveloped within cavity 14 and therefore immersed wholly in the heating medium.

Heater 24 is disposed in a fluid path that is in communication with both cavity 14 and at least one conduit 32 through which the heating medium is introduced into, and/or extracted from, cavity 14. The heating medium traverses heating elements 24a before egress along an exit path 26a from fan 26 into the fluid-tight enclosure. The delivery of the heating medium provides sufficient energy to bladder 20 for deep penetration of tread pattern elements of the tire mold (not shown) into tire P. Tire P is thereby heated to a vulcanizing temperature through bladder 20 and simultaneously pressed in a molding direction. Exemplary embodiments of such systems and demonstrations of their use are disclosed by co-owned EP Patent No. EP 0686492 for TYRE VULCANISATION BY SUPPLYING HEAT FROM THE INSIDE, filed 18 May 1995, and co-owned and co-pending PCT Publication No. WO2013/164282 for a CHAMBER FOR VULCANIZING THE INNER PORTION OF A TIRE AND INCLUDING A FAN, filed 26 Apr. 2013, the entire disclosures of which are incorporated by reference herein.

As further illustrated in FIG. 2, the heating medium is subject to rotation under the effect of relative movement imparted by fan 26. The heating fluid attains sufficient tangential speed Ω within the cavity so as to ensure a good thermal exchange with the internal surface of bladder 20. In order to ensure this advantageous thermal exchange, the heating medium exhibits a speed Ω (see FIG. 1) that derives the necessary vulcanization energy from heater 24 and delivers it to an internal surface of bladder 20.

As pressure changes during a cure cycle, it is contemplated that homogenization of the temperature through the entire volume of the enclosure can be effected. To determine and monitor thermal transfer between the heating medium and the molded tire across the bladder, fluid temperature would be ideally determined along an internal surface of the tire. While some vulcanization processes contemplate the capture of the temperature of a heating medium, sensors for such purposes are usually arranged exterior to the fluid-tight enclosure (e.g., being arranged in pipelines or supply lines for the heating medium).

Measuring fluid temperature along internal tire surfaces presents a complex and expensive challenge. Therefore, reliable and predictable detection and monitoring of the heating medium is demanded for the duration of time under which the heating medium remains under pressure. Such detecting and monitoring, effected within the fluid-tight enclosure, can translate into control of heat transmission to the tire through the heating medium and bladder.

SUMMARY

The invention provides a method of operating a tire vulcanization system (100) during a curing cycle in which a tire (P') is vulcanized in a mold for a predetermined duration under pressure. The tire vulcanization system (100) includes a bladder (120) disposed inside a tire to be vulcanized and at least partially delineating a cavity (114) in which a heating medium circulates. A fan (126) and a heater (124) are immersed in the heating medium, and the heater has one or more heating elements (124a) that provide energy to the heating medium traversing thereover. The method includes providing data that includes at least a bladder exchange surface area (S) for a tire being vulcanized, a temperature differential ($\Delta T$) between the bladder and the heating medium and a coefficient of exchange by forced convection (h). A heating medium temperature in the cavity is detected during a current curing cycle. The heating medium temperature in the cavity (114) is adjusted by adjusting the power output of the heater (124).

In some embodiments, the method includes configuring at least one temperature sensor (150) that is disposed along an exit path (126a) from the fan into the cavity to perform the detecting and to generate one or more temperature signals indicative of the detected heating medium temperature. A monitoring system may be configured to receive the temperature signals and to send one or more commensurate control signals to perform the adjusting.

In some embodiments, the method also includes at least one of initiating a timer upon introducing the heating medium into the cavity for monitoring an elapsed time of the duration under pressure; on the basis of the detected heating medium temperature, calculating a thermal flux ($\phi$) that traverses the bladder during a subsequent curing cycle as a function of at least the bladder exchange surface area (S) and the temperature differential ($\Delta T$) between the bladder and the heating medium; comparing a calculation of the thermal flux ($\phi$) with a required thermal flux to be realized upon commencement of the subsequent cure cycle; and performing the adjusting when a comparison indicates non-equivalence.

The adjusting can include attaining a predicted final heating medium temperature upon termination of the current curing cycle. The adjusting can also include at least one of adjusting a fan speed, adjusting a heating medium pressure and adjusting a heater output, and wherein adjusting the heater output by adjusting a heater supply voltage. The adjusting can further include increasing the heater output during a phase of the elapsed time necessary to attain and maintain a predetermined temperature level of the heating medium, during a predetermined time less than or equal to the duration under pressure.

The invention also provides a method of operating a tire vulcanization system (100) that includes providing data that includes at least a bladder exchange surface area (S) for a tire being vulcanized, a temperature differential ($\Delta T$) between the bladder and the heating medium, and a coefficient of exchange by forced convection (h). A heating medium temperature in the cavity is detected during a current curing cycle. Based upon an energy balance to define the amount of energy to be sent by the vulcanization system (100) in advance of a subsequent curing cycle, a heating medium temperature in the cavity (114) is detected during a current curing cycle. Based upon a detected heating medium temperature, the energy to be sent by the vulcanization system (100) in advance of the subsequent curing cycle is adjusted.

In some embodiments, this method includes calculating an energy required to cure the tire being vulcanized as a function of at least the energy to be supplied for vulcanization of an inner tire surface, energy lost upon opening the mold between the current curing cycle and the subsequent curing cycle and energy lost by the vulcanization system during curing.

The invention also includes a tire vulcanization system (100) for performing the disclosed methods.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Figure 1:
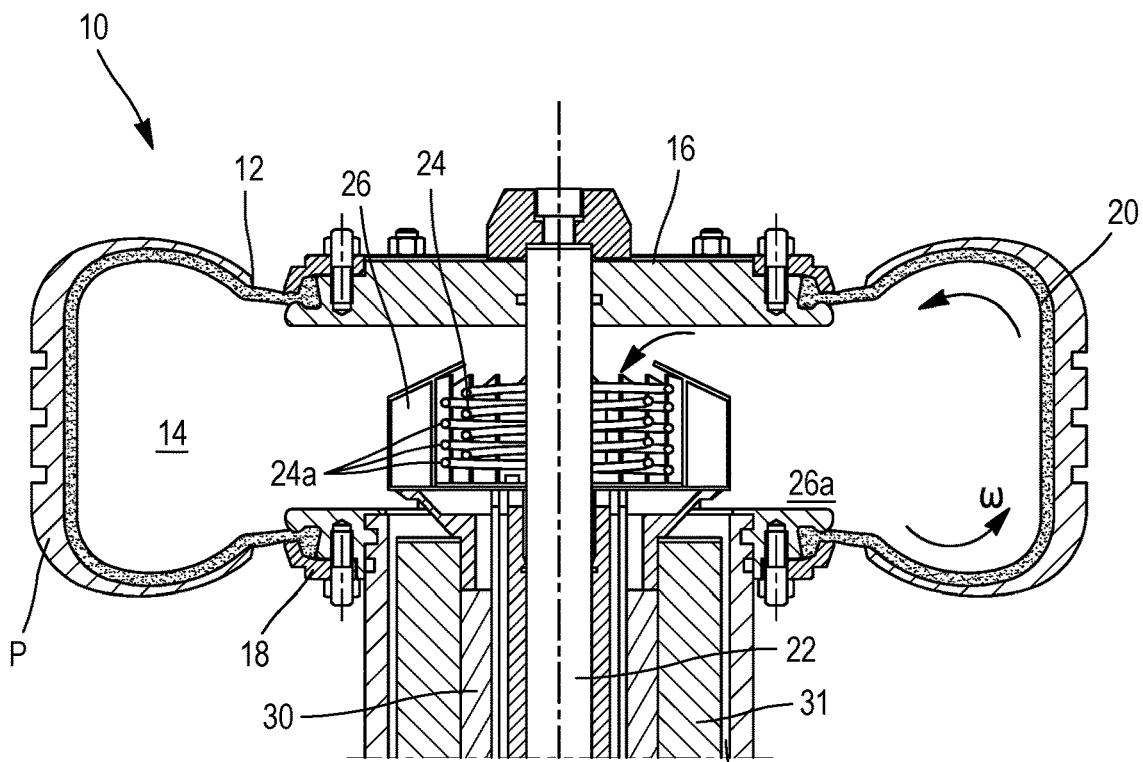
FIG. 1 shows an exemplary conventional electric vulcanization system.
Figure 2:
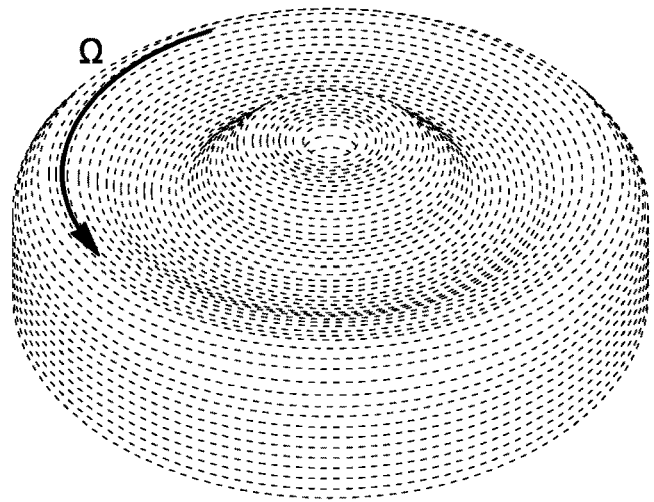
FIG. 2 shows a simulation of a circulation of flux in the conventional vulcanization system of FIG. 1.

Reference now will be made in detail to embodiments of the invention, one or more examples of which are illustrated in the drawings. Each example is provided by way of explanation and not by limitation of the presently disclosed invention. It will be apparent to those skilled in the art that various modifications and variations can be made in the present invention without departing from the scope or spirit of the invention. For instance, features illustrated or described as part of one embodiment can be used with one or more other embodiments to yield at least one further embodiment. Thus, it is intended that the present invention covers such modifications and variations as come within the scope of the appended claims and their equivalents.

Figure 3:
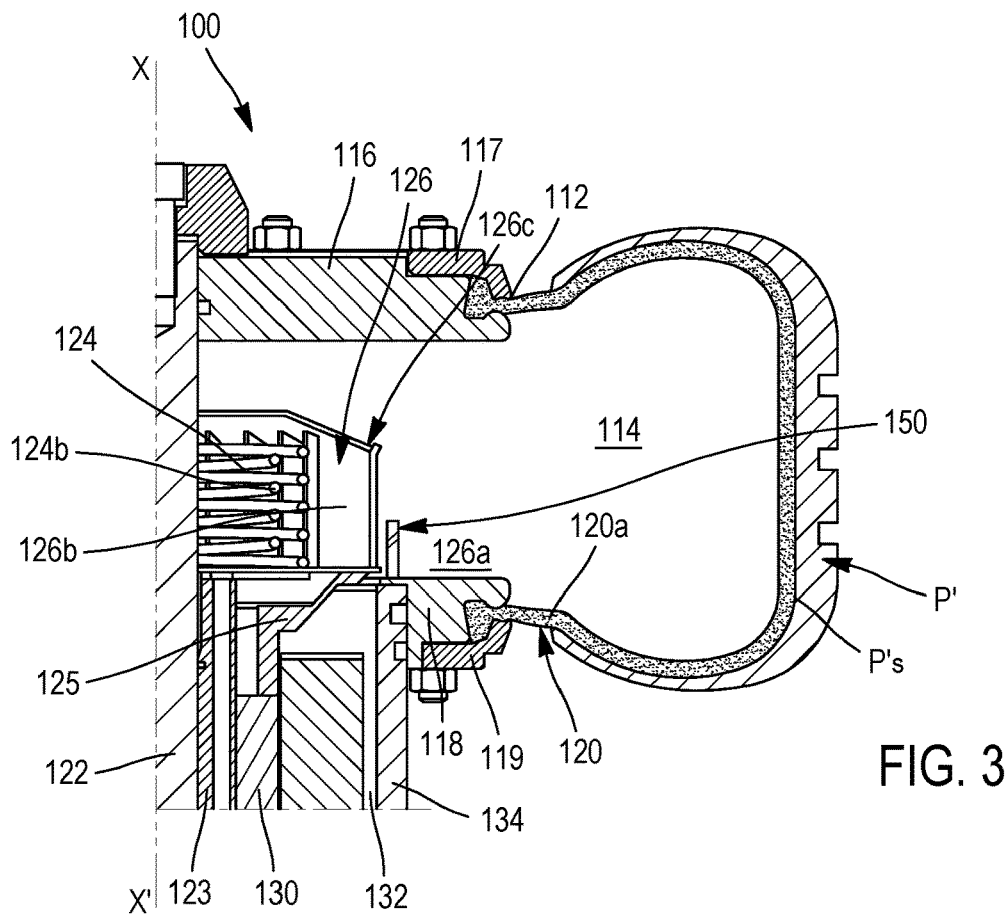
FIG. 3 shows a partial sectional view of an exemplary vulcanization system.
Figure 4:
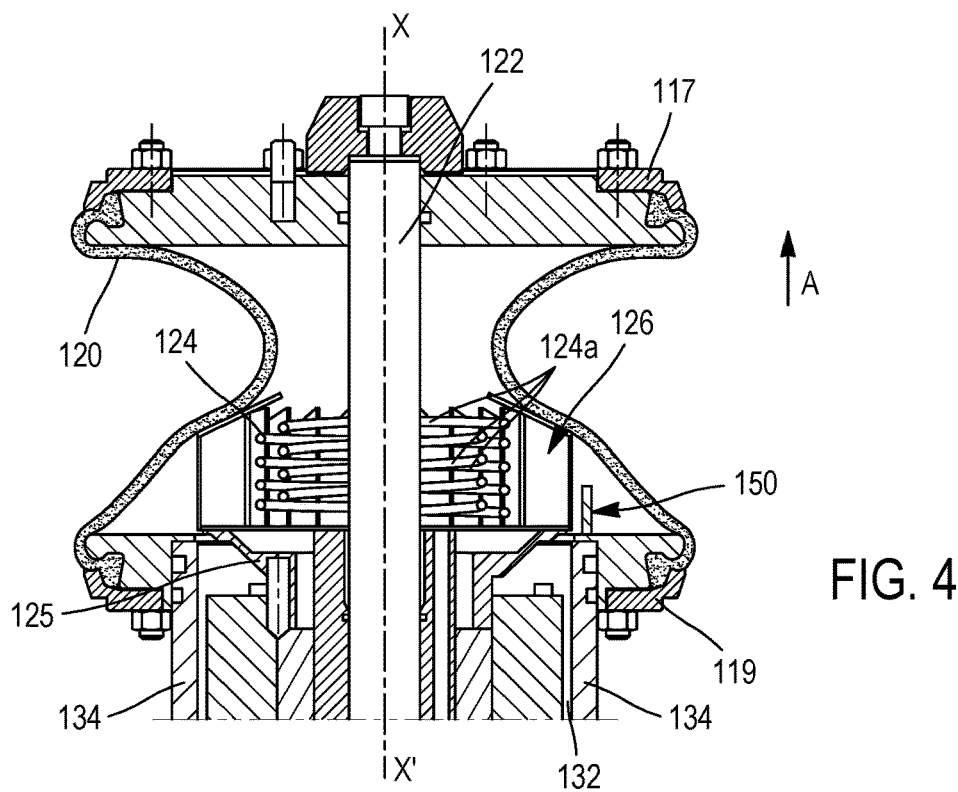
FIG. 4 shows a sectional view of the exemplary vulcanization system of FIG. 3 upon collapse of a curing bladder.

Now referring further to the figures, in which like numbers identify like elements, FIGS. 3 and 4 show an exemplary tire vulcanization system 100 having many of the characteristics of system 10 shown in FIG. 1. Vulcanization system 100 includes an axially movable plate 116 and a stationary plate 118 connected by a flexible bladder or curing membrane 120. Counterplates 117, 119 anchor bladder 120 to respective plates 116, 118 along a circumference thereof. Bladder 120 and plates 116, 118 together delineate a fluid-tight enclosure 112 having a cavity 114 for containing a heating medium under pressure (e.g., nitrogen). Bladder 120 cooperates in a known manner with a rigid tire mold (not shown) intended to form an outer tire shape and sculpture.

A heater 124 is enveloped within cavity 114 and therefore immersed wholly in the heating medium during operation of system 100. Heater 124 is shown as a coil member having heating elements 124a generally formed in an annular shape, although it is understood that heater 124 may be selected from known heater mechanisms that are amenable to practice with the presently disclosed invention. Annular heating elements 124a are amenable to operation with a fan 126 having a plurality of blades 126b and a diametrical extent 126c. One or more blades 126b may have a high thermal conductive material at least partially integrated therewith, including but not limited to copper, aluminum and comparable and equivalent materials. A power source (such as an electric power source, not shown) that is in communication with heater 124 and fan 126 ensures uninterrupted control and operation of both elements within cavity 114.

A central portion of enclosure 112 includes an operating shaft 122 that is rotatable relative to fixed mold 123 along an axis of revolution X-X' of the enclosure. Operating shaft 122 effects exemplary axial movement of plate 116 between a vulcanization position in which bladder 120 abuts an inner wall surface $P_s'$ of tire P' (see FIG. 3) and an extraction position in which bladder 120 collapses (see FIG. 4). Rotor 130 effects circumferential rotation of a substrate 125 supporting fan 126. As is known in the art, rotor 130 sufficiently actuates fan blades 126b so as to impart a proscribed tangential velocity to the ejected heating medium.

Upon commencement of a curing cycle in which a tire (P') is vulcanized in a mold for a predetermined duration under pressure (herein "duration under pressure"), one or more conduits 132 that are delineated in a stationary housing body 134 introduce pressurized heating medium into cavity 114. The heating medium is introduced into the cavity as needed (e.g., continuously or periodically) to maintain sufficient heat transfer along bladder 120 and wall 120a thereof. A valve (not shown) may be provided for automatic introduction and extraction of the heating medium. The heating medium is supplied from a heating medium supply (not shown) as is known in the art. Such heating medium supply may optionally include a preheating device that previously heats the heating medium prior to introduction thereof in cavity 114. It is understood that conduit 132 may include one or more conduits that are also employed for the extraction of the heating medium upon termination of a curing cycle.

The heating medium may be selected from a plurality of heating media amenable to use with a vulcanization system as presently described. In some embodiments, the heating medium is nitrogen which exhibits negligible interdependence between pressure and temperature. When the heating medium is nitrogen (or an equivalent thereof), independent control of the temperature of the heating medium is possible.

Upon actuation of fan 126, the heating medium is drawn through a central portion thereof, traverses heating elements 124a and is ejected along exit path 126a into cavity 114. At least one heating medium temperature sensor 150 (e.g., a thermocouple or equivalent thereof) is disposed intermediate housing body 134 and diametrical extent 126c. In some embodiments, temperature sensor 150 is mounted on stationary plate 118 immediately proximate an egress from which fan 126 delivers the heating medium to exit path 126a. Temperature sensor 150 is configured to detect a temperature of the heating medium in cavity 114 and generates one or more temperature signals indicative of the detected temperature. It is contemplated that temperature sensor 150 may capture the heating medium temperature continuously (e.g., at each instant while a green tire is subject to the pressurized heating medium) or at regular predetermined time intervals.

During a present cure cycle as shown in FIG. 3, bladder 120, under the effect of the pressure of the heating medium, is in a deployed position pressed along inner wall surface $P_s'$ of tire P'. Upon extraction of the heating medium from cavity 114 as shown in FIG. 4, axial movement of plate 116 is effected within pre-defined limits (e.g., in the direction indicated by arrow A) such that bladder 120 collapses toward the central portion of fan 126 (e.g., in order to free space for the passage of a bead). Collapse of bladder 120 positions the bladder in a ready state for a subsequent cure cycle without contacting blades 126b or temperature sensor 150. The positioning of temperature sensor 150 therefore not only ensures effective temperature data capture throughout a curing cycle; it also protects the sensor from damage during extraction and preserves uninterrupted operability of the sensor for multiple curing cycles.

Temperature sensor 150 may be coupled to a monitoring system (not shown) that is configured to receive the temperature signals generated thereby. The monitoring system generates one or more control signals in response to the temperatures detected by temperature sensor 150. Such control signals are used to command the heater.

Internal Control of an Electric Vulcanization System

The monitoring system thus receives the temperature data signals and sends a commensurate heating instruction to heater 124 on the basis of the received temperature data, the desired temperature of the heating medium, the heating time of the heating medium and other factors. Within an electric vulcanization system, such factors are typically set up by a pre-established cycle that has been obtained from observed experimental data. In the art, it is generally understood that agreement between theory and experiment is very good. The applicable temperature, pressure and mold residence time can be thus regulated (e.g., via on-line control) to enable different elastomer compositions to attains a desired cross-linking degree.

The rotational speed of fan 126 must be sufficiently high so that heat transfer toward the tire is assured. Simultaneously, temperature sensor 150 (as shown and described with respect to FIGS. 3 and 4) captures the temperature of the heating medium supplied to cavity 114, therefore providing a pertinent representation of the temperature of the heating medium along inner wall surface 120a of bladder 120.

To counteract the thermal resistance of the bladder, heat flux may be controllably increased during a current curing cycle to ensure sufficient heat flux for vulcanization upon commencement of a subsequent curing cycle. The sensed heating medium temperature may therefore be relied upon in one or more processes for optimizing the transmission of energy by controlling the combination of heater 124 and fan 126.

Assuming that bladder 120 represents the greatest thermal resistance across which energy must be transmitted to the tire, the thermal flux that traverses the bladder may be expressed as:

$$\Phi = h \times S \times \Delta T \qquad (\text{EQ. 1})$$

wherein:
 $\Phi$ is the thermal flux (heat transferred per unit time) in W;
 h is the convection heat transfer coefficient in W/(m²° C.), which is linked to the speed of the heating medium relative to the interior wall of the bladder, and with the speed of the heating medium being linked to the rotational speed of the fan;
 S is the area of the exchange surface (i.e., the heat transfer area of the bladder surface) in m², which is linked to a geometry of the mold in which the tire is formed; and
 $\Delta T$ is a temperature difference between the heating medium and the membrane surface in ° C.

Thus, by providing data that includes at least a bladder exchange surface area (S) unique to each tire being vulcanized, a temperature differential ($\Delta T$) between the bladder and the heating medium unique to each tire being vulcanized, and a coefficient of exchange by forced convection (h) unique to each established cure cycle.

Opened loop and closed loop control modes can be used for controlling heater 124. An opened loop control mode is based upon energy control. In this mode, it necessary to realize an energy balance of vulcanization system 100 and thereby define the amount of energy to send to heater 124 prior to curing. This amount of energy is computed according to the physical characteristics of the green tire, the energy losses realized during curing and the energy losses realized during press opening. Some adjustments can be done during the curing, including a power adjustment according to the opening duration of the press and an additional adjustment according to the heating medium temperature that is measured during a previous curing.

To realize open-loop control of the internal portion of system 100, it is necessary to determine the total required energy to be delivered by heater 124. This energy will raise the temperature of the heating medium and thereby control the rate of heat transfer across the curing membrane. The total energy to be supplied by the heater is obtainable from the energy to be supplied for the vulcanization of the interior of the tire; the energy lost by convection during opening of the tire mold; the energy lost by all mechanical parts of the vulcanization system 100 during curing; and the energy supplied by rotor 130 (e.g., the energy needed to propel fan 126). In order to observe the temperature of the heating medium, temperature sensor 150 may be employed.

The energy that is needed for vulcanization of a tire is the energy that carries the tire from its initial temperature (e.g., ambient temperature) to its desired vulcanization temperature (e.g., as defined by applicable curing laws). This energy is supplied internally by the heating medium and externally by the mold. Based upon experience with multiple curing presses and confirmed by tests carried out on electrical presses, it is observed that the external energy contribution comprises up to about two-thirds of this energy and the internal contribution comprises up to about one-third.

At each instant of the duration of the opening of the mold, the thermal flux (in W) observed at movable plate 116 and bladder 120 can be calculated in order to determine the energy lost during opening of the tire mold. System 100 includes axially movable plate 116 in contact with ambient air and stationary plate 118 having no contact with ambient air.

In order to determine energy that is lost via the mechanical parts of the thermal system 100, the thermal flux (in W) realized at the housing body can be calculated at each instant of the duration under pressure. The thermal flux is deemed constant along stationary plate 118, while the thermal flux realized at housing body 134 decreases at the same rate as the temperature thereof. The thermal flux that exits the mechanical parts of the vulcanization system 100 for the duration under pressure may thus be expressed in terms of initial and ambient temperatures around the housing body.

Based upon experience with multiple curing presses and confirmed by tests carried out on systems commensurate with system 100, the power that is consumed by rotor 130 remains essentially constant in that it is not dependent on the size and shape of a tire's internal cavity. The energy supplied by rotor 130 can be readily determined as a relationship between the consumed power and the length of the duration under pressure.

The pendency of the duration under pressure may be observed at distinct stages during each of which the total energy to be supplied by the heater may be calculated and adjusted. In an exemplary programmable open loop process, activation and control of heater 124 may be realized in a phase during which the energy is transferred toward the tire upon commencement of the duration under pressure. With an open-loop control, stability of the heating medium temperature is ensured by capturing such temperature during the duration under pressure. In the presently disclosed open-loop process, it is observed that a rise in the heating medium temperature has a duration that is measured from an initial time. Upon commencement of the duration under pressure, the heating medium temperature falls quickly and settles at a limit within a predictable temperature limit. Thus, power loss can be predicted and the heater output adjusted accordingly by adjusting the heater supply voltage.

An optional correction or adjustment may be calculated in which the coefficient of exchange by forced convection h is presumed to be, on average, twice as low at a predicted elapsed time of the duration under pressure as compared with a remainder of the duration under pressure. To offset the decline of the exchange coefficient h, the presently disclosed method, during a phase of the elapsed time that is necessary for the introduction of power that is twice as large as that introduced during the subsequent remainder of the duration under pressure. Thus, the durations of elapsed time can be adjusted to ensure that the power realized does not surpass a maximum power of the heater. For example, in practice, a limit of 0.90 can be established so as to ensure a power reserve.

Activation of heater 124 ceases and the system is permitted to homogenize until the end of the duration under pressure, at which time the heating medium settles in a final temperature range. The diminution of the heating medium temperature is linked to the transfer of energy toward the tire and to energy losses from the system. For example, upon deactivation of the heater, the pressure of the heating medium in bladder 120 may be low, thereby resulting in correspondingly low heat exchange. An error calculation may be performed in an experimental model or simulation such that the power levels are adjusted to compensate for this captured temperature value.

Likewise, the time during which the mold is open has an effect on the predicted energy and therefore a commensurate effect on power. Automation of vulcanization system 100 captures a mold open period and therefore readily calculates an adjustment to power according to the presently disclosed process.

The presently disclosed process enables reliable and repeatable power predictions and thereby permits management of cure while the vulcanization system is in a stabilized state (i.e., the predicted energy ensures cure of the tire and equally compensates for energy losses). It is understood that different phases of controlling a heater throughout a duration under pressure can be effected for any tire size and type, as would be understood by a skilled person.

In a closed loop control mode, the objective is to induce the requisite temperature at the inner wall 120a of the bladder 120. Temperature sensor 150 is used to measure and control the temperature at the inner wall 120a of the bladder 120.

Figure 5:
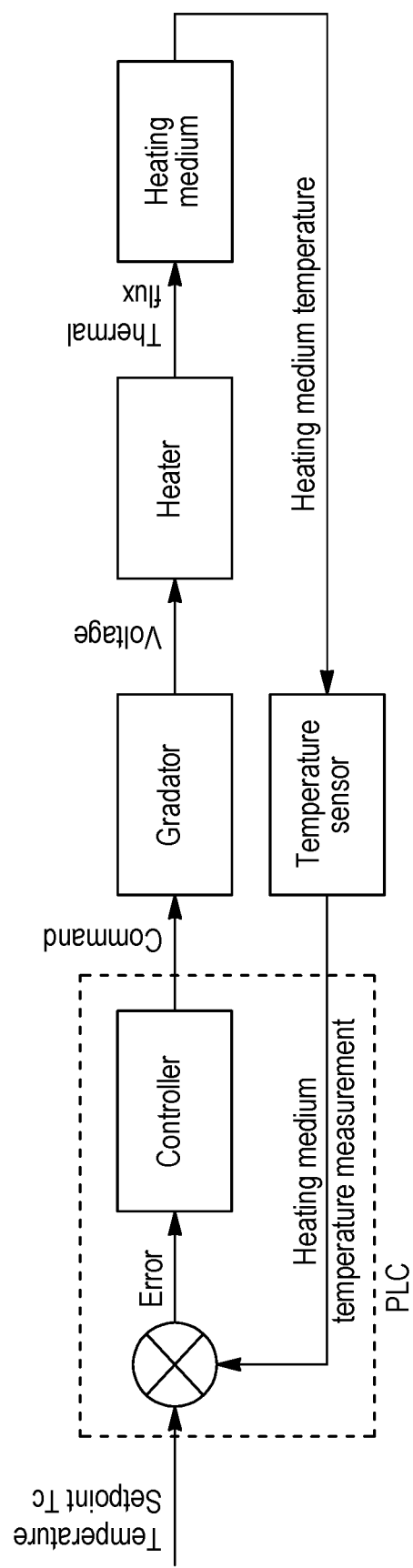
FIG. 5 shows an exemplary closed-loop embodiment of a process for controlling a heating medium temperature.

The block diagram of FIG. 5 represents an exemplary programmable control loop. The setpoint temperature Tc level and duration are defined by experiment. This duration can be inferior or equal to the duration under pressure. This control may be realized by an exemplary control loop as shown and attained, for example, by a programmable logic controller (PLC). It is understood that a setpoint temperature $T_c$ can be established for any tire size and type in accordance with applicable cure law, as would be understood by a skilled person.

In the exemplary closed-loop process, heater 124 may be deactivated upon lapse of the duration under pressure so as to ensure homogenization within cavity 114. Homogenization is maintained until expiration of the duration under pressure, at which time the heating medium attains a final temperature. The decrease in the temperature of the heating medium is attributable not only to heat transfer to the tire but also to the inherent losses of the vulcanization system.

In embodiments that utilize a closed-loop control, fan 126 may be activated as soon as the tire is charged in a press and the pressure in the curing membrane passes a minimum threshold. In such embodiments, operation of fan 126 may be selectively terminated during the entire duration under pressure upon realizing sufficient heat transfer toward the tire.

In order to verify quality and repeatability of tire curing cycles, a verification system is put in place on the vulcanization system. The principle of verification of the extent of cure is based upon the principle set out in Table 1 below:

TABLE 1

| Type de Control | Verification of the solicitation | Verification of thermal transfer | Complementary Verification |
|---|---|---|---|
| Closed-loop | Temperature | Pressure Fan speed | Temperature of the heating medium |
| Open loop | Output power of the heater | Pressure Fan speed | Temperature of the heating medium |

It is demonstrated that the presently disclosed embodiments allow unimpeded flow of the heating medium while controlling the temperature thereof throughout a cure cycle and during phases thereof. As taught herein, an adaptation to shorter curing cycles may be effected with commensurately truncated pressurization periods. The presently disclosed system and method establish a temperature throughout the fluid-tight enclosure that remains homogeneous throughout the cure. This is performed within generally known vulcanization systems by establishing and maintaining control of the heater without effecting fundamental changes to existing procedure.

At least some of the various techniques described herein may be implemented in connection with hardware or software or, where appropriate, with a combination of both. For example, electrical data processing functionality may be used to implement any aspect of power computation and adjustment, including implementation in connection with a computing device (including a mobile networking apparatus) that includes hardware, software, or, where appropriate, a combination of both. The processing functionality may correspond to any type of computing device that includes one or more processing devices. The computing device can include any type of computer, computer system or other programmable electronic device, including a client computer, a server computer, a portable computer (including a laptop and a tablet), a handheld computer, a mobile phone (including a smart phone), a gaming device, an embedded controller, a near-field communication device, a device with applications implemented at least partly using a cloud service, and any combination and/or equivalent thereof (including touchless devices). Moreover, the computing device may be implemented using one or more networked computers, e.g., in a cluster or other distributed computing system. The network may be a LAN, a WAN, a SAN, a wireless network, a cellular network, radio links, optical links and/or the Internet, although the network is not limited to these network selections. A server may be further configured to facilitate communication between at least one module as presently disclosed and one or more of the computing devices.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A method of operating a tire vulcanization system during a curing cycle in which a tire is vulcanized in a mold for a predetermined duration under pressure, the tire vulcanization system including an axially movable plate and a stationary plate connected by a bladder disposed inside a tire to be vulcanized and at least partially delineating a cavity in which a heating medium circulates, with a fan and a heater being immersed in the heating medium and the heater having one or more heating elements that provide energy to the heating medium traversing thereover, the method comprising:

providing data, for a current curing cycle, that includes at least a bladder exchange surface area S for a tire being vulcanized, a temperature differential $\Delta T$ between the bladder and the heating medium, and a coefficient of exchange by forced convection h;

detecting a heating medium temperature in the cavity during the current curing cycle;

on the basis of the detected heating medium temperature, calculating a thermal flux $\phi$ that traverses the bladder during a subsequent curing cycle as a function of at least the bladder exchange surface area S and the temperature differential;

comparing the calculated thermal flux with a required thermal flux to be realized upon commencement of the subsequent curing cycle; and adjusting the heating medium temperature in the cavity when a comparison between the calculated thermal flux and the required thermal flux indicates a non-equivalence therebetween.

2. The method of claim 1, further comprising:

configuring at least one temperature sensor to perform the detecting step and to generate one or more temperature signals indicative of the detected heating medium temperature, the at least one temperature sensor being mounted on or near the stationary plate immediately proximate an egress from which the fan delivers the heating medium and that is disposed along an exit path from the fan into the cavity; and configuring a monitoring system to receive the one or more temperature signals and send one or more control signals to perform the adjusting.

3. The method of claim 1, further comprising:
initiating a timer upon introducing the heating medium into the cavity for monitoring an elapsed time of the duration under pressure.

4. The method of claim 3, wherein the adjusting includes attaining a predicted final heating medium temperature upon termination of the current curing cycle.

5. The method of claim 3, wherein the adjusting includes at least one of adjusting a fan speed, adjusting a heating medium pressure and adjusting a heater output, and
wherein adjusting the heater output is accomplished by adjusting a heater supply voltage.

6. The method of claim 5, wherein the adjusting includes increasing the heater output during a phase of the elapsed time necessary to attain and maintain a predetermined temperature level of the heating medium, during a predetermined time less than or equal to the duration under pressure.

7. The method of claim 1, further comprising, based on the detected heating medium temperature, calculating an energy required to cure the tire being vulcanized as a function of at least the energy to be supplied for vulcanization of an inner tire surface, energy lost upon opening the mold between the current curing cycle and the subsequent curing cycle, and energy lost by the vulcanization system during curing.

8. The method of claim 7, wherein the calculated energy is delivered upon commencement of the duration under pressure.

9. The method of claim 8, wherein, during at least a portion of the duration under pressure, a heating medium pressure increases and wherein, during another portion of the elapsed time, the heating medium pressure remains constant.

10. The method of claim 9, wherein the adjusting includes terminating the adjusting so as to attain a predicted final heating medium temperature upon lapse of the duration under pressure.

11. The method of claim 7, further comprising, on the basis of predicted energy, calculating an adjustment as a function of the energy lost by the vulcanization system and a period during which the mold is open.

12. The method of claim 1, wherein the heating medium comprises nitrogen.

13. The method of claim 1, further comprising providing at least one programmable controller in signal communication with the vulcanization system for programming at least one of the current curing cycle and the subsequent curing cycle.

* * * * *